(12) United States Patent
Rawal et al.

(10) Patent No.: US 11,514,488 B1
(45) Date of Patent: Nov. 29, 2022

(54) AUTOMATIC SYNCHRONIZATION OF PAYMENT DATA ACROSS DISTRIBUTED SYSTEMS

(71) Applicant: COUPA SOFTWARE INCORPORATED, San Mateo, CA (US)

(72) Inventors: Tushar Rawal, San Mateo, CA (US); Scott Harris, Menlo Park, CA (US)

(73) Assignee: COUPA SOFTWARE INCORPORATED, San Mateo, CA (US)

(*) Notice: Subject to any disclaimer, the term of this patent is extended or adjusted under 35 U.S.C. 154(b) by 208 days.

(21) Appl. No.: 16/865,068

(22) Filed: May 1, 2020

(51) Int. Cl.
| | |
|---|---|
| *G07F 19/00* | (2006.01) |
| *G06Q 30/04* | (2012.01) |
| *G06Q 30/00* | (2012.01) |
| *G06F 16/27* | (2019.01) |
| *G06F 16/23* | (2019.01) |
| *G06F 16/9535* | (2019.01) |
| *G06Q 10/10* | (2012.01) |

(52) U.S. Cl.
CPC ......... *G06Q 30/04* (2013.01); *G06F 16/2379* (2019.01); *G06F 16/27* (2019.01); *G06F 16/9535* (2019.01); *G06Q 10/10* (2013.01); *G06Q 30/0185* (2013.01)

(58) Field of Classification Search
CPC .... G06Q 30/04; G06Q 10/10; G06Q 30/0185; G06F 16/2379
See application file for complete search history.

(56) References Cited

U.S. PATENT DOCUMENTS

| | | |
|---|---|---|
| 8,065,202 B1 | 11/2011 | Ballaro |
| 2002/0161602 A1 | 10/2002 | Dougherty |
| 2003/0154154 A1 | 8/2003 | Sayal |
| (Continued) | | |

FOREIGN PATENT DOCUMENTS

| | | | | |
|---|---|---|---|---|
| WO | WO-9933010 A1 | * | 7/1999 | ........... G06Q 20/102 |

OTHER PUBLICATIONS

Harris, U.S. Appl. No. 15/714,822, filed Sep. 25, 2019, Interview Summary, dated Oct. 23, 2019.

(Continued)

*Primary Examiner* — Rokib Masud
(74) *Attorney, Agent, or Firm* — Baker Botts L.L.P.

(57) ABSTRACT

In an embodiment, a computer-implemented method comprises receiving supplier invoice data comprising one or more supplier payment objects corresponding to a supplier to a customer of a supplier-customer transaction. A match determination is made between the supplier payment object and a verified payment object. In response to a no-match determination, a customer transaction system is queried to validate the supplier, and in response to the supplier validation, a validation payment object is created, validating the supplier. A match determination is made between the supplier payment object and the verified payment object, and the supplier invoice is automatically generated. In response to receiving subsequent supplier invoice data corresponding to the supplier of subsequent supplier-client transactions, for each subsequent supplier-client transaction, the subsequent supplier invoice is automatically generated with the verified payment object.

12 Claims, 7 Drawing Sheets

(56) References Cited

U.S. PATENT DOCUMENTS

| | | |
|---|---|---|
| 2004/0225571 A1 | 11/2004 | Urali |
| 2008/0120573 A1 | 5/2008 | Gilbert |
| 2008/0201254 A1 | 8/2008 | Sharma |
| 2010/0299234 A1* | 11/2010 | Stone .................. G06Q 40/02 705/30 |
| 2011/0119178 A1 | 5/2011 | Clayton |
| 2011/0295761 A1 | 12/2011 | Sudo |
| 2013/0332210 A1 | 12/2013 | Wyganowski |
| 2014/0278626 A1 | 9/2014 | Stollarski |

OTHER PUBLICATIONS

Harris, U.S. Appl. No. 15/714,822, filed Sep. 25, 2017, Final Office Action, dated Feb. 6, 2020.
Harris, U.S. Appl. No. 15/714,822, filed Sep. 25, 2017, Office Action, dated Aug. 5, 2019.

* cited by examiner

AUTOMATIC SYNCHRONIZATION OF PAYMENT DATA ACROSS DISTRIBUTED SYSTEMS

TECHNICAL FIELD

One technical field of the present disclosure is automatic synchronization of data in distributed computer systems. Another technical field is automatic creation of records in a second distributed computer system in response to an action in a first system. Other technical fields are computer-implemented spend management and e-procurement systems, enterprise resource planning (ERP) and financial data management systems.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Computer-implemented spend management and procurement management systems now are widely used. In these systems customer or buyer accounts are established for management procurement or purchasing activities. Such e-procurement activities may include generating electronic supplier invoices for submission to buyers.

In typical computer-implemented procurement processes, a customer submits a digital electronic purchase order or requisition to a supplier. After receiving the purchase order, the supplier generates an electronic invoice based on the purchase order that typically specifies information such as supplier address, banking information for remitting payment, and a final amount to be paid for the requested supplier-provided goods or services.

To improve e-commerce processes, business enterprises have attempted to automate parts of electronic transactions while reducing security threats. For example, e-procurement activities may use shared electronic financial management systems to maintain multiple customer accounts and invoice submission to buyers or buyer accounts, all or some of which can be electronically processed. A customer purchase order may automatically trigger supplier invoice processing to a transaction management system, but the remaining generation process usually requires manual entry or supervision of certain data such as supplier financial payment information, supplier address, and bank routing and account information. The electronic management system may have an old supplier address due to supplier relocation since the last transaction with a common buyer. Similarly, the supplier's banking information may have changed.

These e-procurement processes are subject to security issues. An unauthorized third party can fraudulently intercept electronic transactions by posing as an authorized supplier and re-directing customer payments intended for the supplier to its account. Existing electronic transaction management systems have taken measures to guard against security threats by requiring customer invoice verification prior to supplier account payment distribution, but this can be a laborious manual process.

SUMMARY

The appended claims may serve as a summary of the invention.

DETAILED DESCRIPTION

Figure 1:
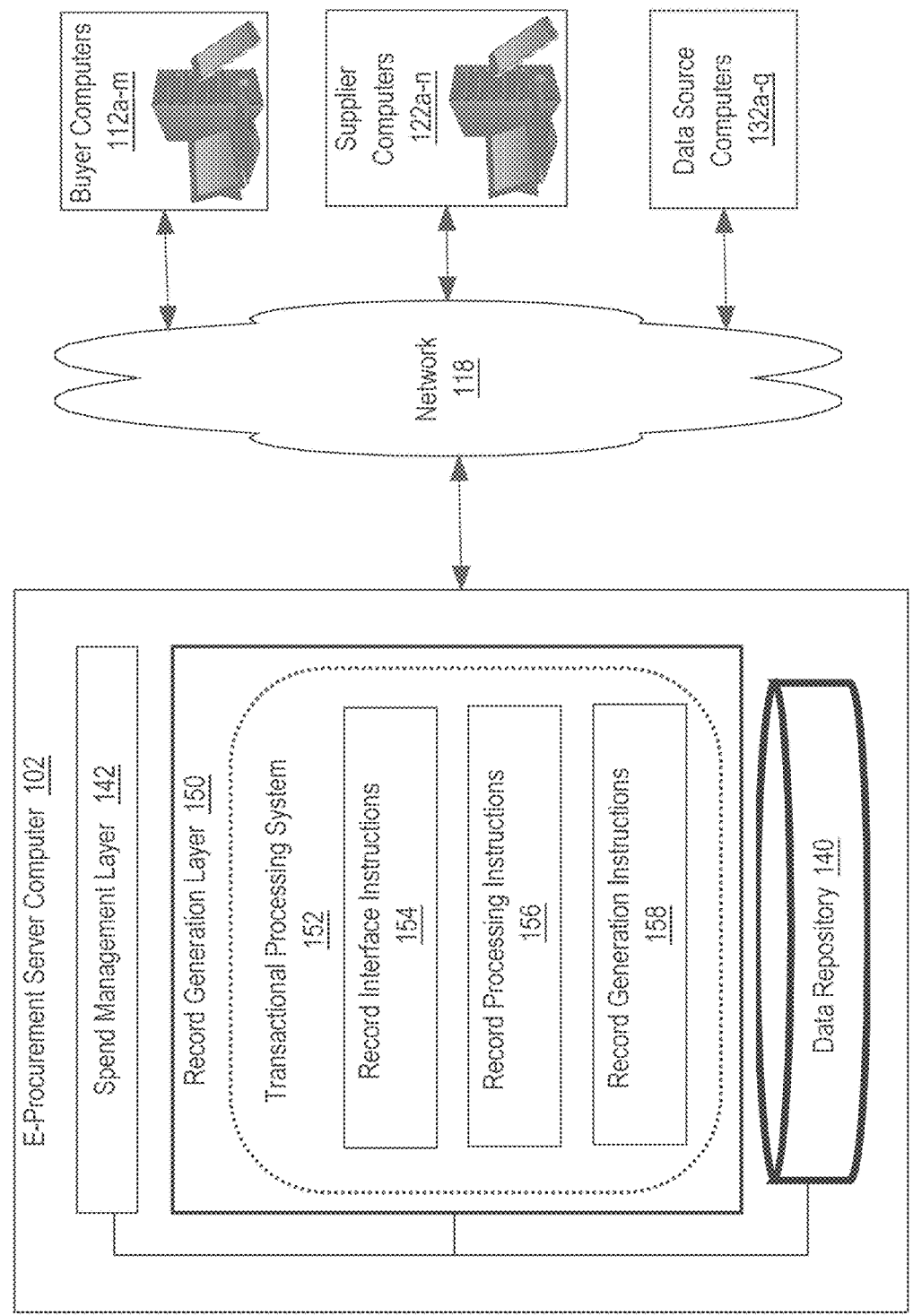
FIG. 1 illustrates an example networked computer system with which various embodiments may be practiced.

In the following detailed description, for the purposes of explanation, numerous specific details are set forth in order to provide a thorough understanding of various embodiments of improved linking of buyer accounts with suppliers in an electronic spend management system based on community overage data. It will be apparent, however, that the embodiments may be practiced without these specific details. In other instances, well-known structures and devices are shown in block diagram form in order to avoid unnecessarily obscuring the embodiments.

Embodiments are described in sections according to the following outline:

1.0 GENERAL OVERVIEW
2.0 EXAMPLE NETWORKED COMPUTER SYSTEM
3.0 EXAMPLE AUTOMATED INVOICE GENERATION PROCESS
4.0 EXAMPLE NETWORKED COMPUTING ENVIRONMENT
5.0 EXAMPLE PROCEDURE
6.0 IMPLEMENTATION EXAMPLE—HARDWARE OVERVIEW
7.0 EXTENSIONS AND ALTERNATIVES

1.0 General Overview

Techniques, systems, methods, and computer products are provided for improving e-commerce transactions by automating invoice generation processes between customer computer devices and supplier computer devices. The disclosed approaches facilitate creation, entry, and processing of supplier payment information among different computers associated with supplier and customer users across one or more communication networks in e-commerce transactions. More specifically, these approaches facilitate integrating into a supplier invoice the data for a pre-validated supplier of a corresponding buyer. In one embodiment, data identifying a supplier may be entered in an e-procurement system as part of invoice instruction data, buyer data may be retrieved from an ERP system, validated as part of a user workflow, and then stored in a mapping in the e-procurement system. Additionally or alternatively, the buyer's ERP system may already have relevant supplier data, which is loaded by the buyer from the ERP system to an independent e-procurement system; the supplier is provided with prepopulated "Remit to" data and payment information so that the supplier is not required to manually enter that data. Instead, the supplier may confirm the data, which is marked in the e-procurement system as pre-validated and stored in a mapping. Later invoice processing will not require manual validation of the buyer data. For example, supplier invoices may be automatically pre-populated with supplier payment information for buyer-supplier electronic transactions after a first-time supplier validation (or authorization). Change to the supplier payment information triggers supplier re-validation.

Supplier pre-authorization (or pre-validation) may be facilitated by the disclosed system in accordance with various methods. A previously unknown supplier is automatically detected by the system triggering supplier payment information verification prior to any supplier transaction. In an embodiment, the supplier computer initiates the electronic invoice generation process. In an embodiment, a request from a customer transaction system or a supplier computer system can initiate supplier authorization, a process that allows only a known customer to the system to authorize the supplier.

In an embodiment, a request from a buyer computer or customer transaction system may initiate an electronic invoice generation process. The request may take on various forms, among which are messages or purchase order transmission to the supplier computer system. In an example embodiment, the customer transaction system may be a customer enterprise resource planning (ERP) system. The disclosed system compares supplier-provided payment information with pre-verified payment information for a match. Successful matches cause linking supplier payment information and verified payment information (or supplier to buyer customer) thereby bypassing future supplier payment information entry and/or verification. In an embodiment, in response to receiving a supplier invoice, the system prepopulates, in part or in whole, the supplier invoice with supplier payment information, or supplier payment data, at least partially automating the supplier verification (or validation) process.

If the absence of a match, the disclosed system may resort to other supplier authorization methods, such as without limitation, by request from a customer ERP system through customer and/or buyer onboarding processes, for example. In accordance with various disclosed methods, upon completion of supplier validation, the disclosed method generates verified payment information to facilitate the automation of subsequent customer-supplier e-commerce transactions.

In an example embodiment, the disclosed method automatically updates a part or the entirety of the verified payment information in response to a change to the supplier-provided payment information. Copies of a part or all of the changed supplier payment information are stored to facilitate secure e-transaction with multi-source verification.

In an embodiment, supplier and customer identifications form a basis for supplier pre-authorization. The disclosed method facilitates a first-time supplier verification by comparing supplier and customer identifications and in response to determining a match, creating an indication of a link between supplier and customer. In an embodiment, a match indication may be in the form of a map entry, flag, tag, linked, or other marked entry. In one embodiment, supplier invoices can be created at subsequent supplier-customer transactions by detecting the map entry, flag, tag, link or other marked entry.

In an example embodiment, supplier-provided payment information is generated and entered into a buyer customer ERP system for verification. The location of a part or an entirety of supplier-provided payment information on an electronic supplier invoice is made available to a customer ERP system for convenient payment processing. For example, the disclosed method provides entered and collected electronic supplier payment information to the customer ERP system for convenient customer payment distribution.

In an example method of the disclosure, linked supplier-customer pairs automate e-commerce transactions between the pair. In one embodiment, electronic supplier invoices can be created, or supplier data can be used in other ways, after a first-time supplier validation. In an embodiment, prepopulating an electronic supplier invoice can be executed using a supplier payment object or supplier payment data. An example payment object is a "Remit to" address, which may comprise the supplier's physical or electronic address to which buyer payments are mailed or electronically transmitted against the supplier invoice.

In an embodiment, in response to receiving supplier payment information, the system determines a verified supplier by comparing one or more (existing) verified payment objects and an incoming supplier payment object, or incoming supplier payment data. In an embodiment, the disclosed method searches a mapping table for a map entry corresponding to the supplier. In an embodiment, a supplier identification assists in finding a map entry indicative of an existing link between supplier and buyer. Map entries of the mapping table may represent existing links between suppliers and buyers. In an embodiment, the disclosed method compares supplier-provided payment objects and customer-verified payment objects. In an embodiment, the presence of a map entry is an indicator of a supplier-customer link. In an embodiment, the map entry includes verified payment object, or verified payment data, corresponding to the supplier.

In an embodiment, a first-time supplier verification—determination of a supplier-customer link indication—automates subsequent e-transactions between buyer and supplier. Supplier invoices are automatically populated with stored verified payment information in response to a matched or linked, supplier-customer pair.

In some embodiments, updates to supplier payment information unlinks supplier-customer matches and automatically triggers supplier re-validation process(es) and the supplier is no longer considered pre-authorized until the process of supplier re-validation is completed.

In some embodiments, the disclosed method includes providing a list of known supplier payment information to graphics user interface (GUI) of a corresponding customer computer for selection by a customer, and in response to receiving a customer selection, the disclosed method updates an existing verified payment object or generates a new, verified payment object corresponding to the supplier of the customer for subsequent invoice generation automation of e-transactions between the customer and supplier. In an embodiment, a single customer is linked to more than one supplier.

In an embodiment, a computer-implemented method comprises receiving supplier invoice data, including supplier payment information comprising one or more supplier payment objects corresponding to a supplier of a supplier-customer transaction with a customer. A match determination is made between the supplier payment object and a verified payment object. In response to a no-match determination, a customer transaction system is queried to validate the supplier, and in response to the supplier validation, a validation payment object is created, validating the supplier. A match determination is made between the supplier payment object and the verified payment object, and the resulting data is used or a supplier invoice is generated. In one embodiment, in response to receiving subsequent supplier invoice data corresponding to the supplier of subsequent supplier-client transactions, for each subsequent supplier-client transaction, a supplier invoice is generated using data from the verified payment object, or the verified payment object data is alerted to the user for use in creating an invoice.

The disclosed approaches enhance e-commerce processes, efficiency, and security by supplier pre-validation process. A one-time supplier authorization facilitates automation of subsequent supplier invoice generation. The disclosed approaches further enhance e-commerce customer convenience by collecting and entering supplier payment information locations of electronic supplier invoices onto a customer transaction system to assist with customer payment distribution processes.

In some embodiments, the system is programmed not to automatically generate invoices unless the buyer and supplier have agreed to a set of legal compliant invoicing terms via an electronic document exchange.

In various embodiments, different methods may be programmed to determine that payment object information is validated or has been validated. In one embodiment, a supplier may be entered as part of Invoice instructions, and buyer data may be provided from an ERP and is validated by manual steps and stored as a mapping. In another embodiment, the buyer's ERP system already has the data, and the buyer data is moved from the ERP system to an e-procurement system. The-procurement system may be programmed to provide the supplier with pre-populated "Remit-To" data along with payment information. In this case, the supplier computer does not have to manually enter the buyer data, but can rather just confirm it, and the resulting record is considered pre-validated and stored as a mapping.

2.0 Example Networked Computer System

FIG. 1 illustrates an example networked computer system with which various embodiments may be practiced. FIG. 1 is shown in simplified, schematic format for purposes of illustrating a clear example, and other embodiments may include more, fewer, or different elements.

In some embodiments, a networked computer system comprises an e-procurement server computer 102 or server, one or more supplier computers 122*a-n*, one or more buyer computers 112*a-m*, and one or more data source computers 132, which are communicatively coupled, directly or indirectly, via one or more networks 118. In some embodiments, the server 102 broadly represents one or more computers, such as a server farm, a cloud computing platform, or a parallel computer, virtual computing instances, and/or instances of a server-based application.

The server 102 may comprise a spend management layer 142 consisting of stored program instructions that are programmed or configured to host or execute functions including but not limited to managing buyer accounts associated with the one or more buyer computers 112*a-m* and supplier accounts associated with the one or more supplier computers 122*a-n*, and facilitating generation and maintenance of digital documents during procurement transactions between buyer accounts and supplier accounts, such as catalogs, purchase requisitions, purchase orders, or invoices. The server 102 also comprises a cost data management layer 150 consisting of stored program instructions that are programmed or configured to host or execute functions including but not limited to calculating overage metrics associated with commodity items and/or supplier accounts and generating a recommendation for alternate suppliers to buyer accounts. In general, a commodity is a description of the type of product or service being purchased. A commodity item is a specific product or service being purchased.

FIG. 1 also illustrates example components of a server 102 in accordance with the disclosed embodiments. In various embodiments, one or more of the functional components can be implemented as software components, general or specific-purpose hardware components, firmware components, or any combination thereof. A storage component can be implemented using any one or more of relational databases, object databases, flat file systems, or JSON stores. A storage component can be connected to the functional components locally or through the networks using programmatic calls, remote procedure call (RPC) facilities, or a messaging bus. A component may or may not be self-contained. Depending upon implementation-specific or other considerations, the components may be centralized or distributed functionally or physically.

In some embodiments, the electronic record generation layer 150 can comprise stored program instructions organized as electronic transactional processing system 152, which in turn can comprise computer-executable instructions, including record interface instructions 154, record processing instructions 156, and record generation instructions 158. In addition, the server 102 can comprise a database module 140.

In some embodiments, the transactional processing system 152 is configured or programmed to collect and transmit transactional data or documents, such as catalogs, purchase requisitions, purchase orders, or invoices, between supplier computers and buyer computers and maintain the transactional data in memories. Specifically, the transaction processing system 152 enables managing the transactional data by semantic units, such as individual item descriptions or prices. For example, a catalog retrieved from a supplier computer can be parsed into these semantic units, or a graphical user interface can be presented for entering or selecting such semantic units in generating a purchase requisition. Additional metadata that may not be part of the transactional data can also be stored with the transactional data, such as the date of creation or the list of accounts accessing the transactional data.

In some embodiments, record interface instructions 154 receive supplier invoice data, including one or more payment objects identifying supplier payment information of a corresponding supplier. In an embodiment, a payment object is digitally stored data identifying "Remit to" information, and in another embodiment, the payment object may represent other types of payment information.

In some embodiments, the record generation instructions 158 enable analyzing transactional data and verifying suppliers based at least in part on a match between payment objects and verified payment objects of previously-verified supplier payment information. In response to a match between a payment object and a verified payment object, the record generation instructions 158 enable automatically populating a supplier invoice with a verified payment object. The record generation instructions 158 may include instructions that, when executed in response to determining the absence of a match between the payment object and a verified payment object, may alternatively cause querying customer computer devices to verify the payment object.

In some embodiments, the database module 140 is programmed or configured to manage relevant data structures and store relevant data for functions performed by the server 102. In association with the cost data management layer 150, the data may include supplier data, buyer data, transactional data, overage data including one or more overages, metric data of one or more overages, dispute metric data, and/or rejected invoice metric data.

In some embodiments, each of the buyer computers 112*a-m* broadly represents one or more computers, virtual computing instances, and/or instances of an e-procurement application program that are associated with an institution or entity that is related as a buyer account with respect to a separate entity associated with one of the supplier computers 122*a-n*. A buyer computer 112*a* is programmed to create a buyer account with the server 102 and manage digital documents related to a buyer account during procurement transactions, such as receiving a catalog of items for sale from the server 102, generating or transmitting a purchase requisition or purchase order for some of the items for sale to the server 102, or receiving an invoice for some of the items for sale from the server 102. The buyer computer 112*a* may comprise a desktop computer, laptop computer, tablet computer, smartphone, wearable device, or any other type of computing device that is capable of proper communication with the server 102 as well as adequate local data processing and storage. In some cases, a buyer computer 112*a* may be a personal computer or workstation that hosts or executes a browser and communicates via HTTP and HTML over the network 118 with a server-side e-procurement application hosted or executed at the server 102. In other cases, a buyer computer 112*a* may be a server-class computer and/or virtual computing instance that hosts or executes an instance of an e-procurement application that communicates programmatically via API calls, RPC or other programmatic messaging with the server 102.

Similarly, in some embodiments, each of the supplier computer 122*a-n* broadly represents one or more computers, virtual computing instances, and/or instances of an e-procurement application program that are associated with an institution or entity that is related as a supplier with respect to a separate entity associated with one of the buyer computer 112*a-m*. A supplier computer 122*a* is programmed to create a supplier account with the server 102 and manage digital documents related to a supplier account during procurement transactions, such as generating or transmitting a catalog of items for sale to the server 102, receiving a purchase order for some of the items for sale from the server 102, or generating or transmitting an invoice for some of the items for sale to the server 102. A supplier computer 122*a* may comprise a desktop computer, laptop computer, tablet computer, smartphone, wearable device, or any other type of computing device that is capable of proper communication with the server as well as adequate local data processing and storage. In some cases, a supplier computer 122*a* may be a personal computer or workstation that hosts or executes a browser and communicates via HTTP and HTML over network 118 with a server-side e-procurement application hosted or executed at the server 102. In other cases, a supplier computer 122*a* may be a server-class computer and/or virtual computing instance that hosts or executes an instance of an e-procurement application that communicates programmatically via API calls, RPC or other programmatic messaging with the server 102.

In some embodiments, each of the data source computer 132*a-q* broadly represents one or more computers, virtual computing instances, and/or instances of a data management application program with a communication interface. A data source computer 132*a* is programmed to manage one or more data sources, receive a request for certain data in the one or more data sources from the server 102, and send a response to the request to the server 102. The data source computer 132*a* can comprise any computing facility with sufficient computing power in data processing, data storage, and network communication for the above-described functions.

In some embodiments, the network 118 may be implemented by any medium or mechanism that provides for the exchange of data between the various elements of FIG. 1. Examples of the network 118 include, without limitation, one or more of a cellular network, communicatively coupled with a data connection to the computing devices over a cellular antenna, a near-field communication (NFC) network, a Local Area Network (LAN), a Wide Area Network (WAN), the Internet, a terrestrial or satellite link, etc.

In some embodiments, through the cost data management layer 150, the server 102 is programmed to receive or transmit transactional data, such as metric data of one or more overages, purchase requisitions, purchase orders, or invoices, from or to the buyer computers 112*a-m* or the supplier computers 122*a-n*. In other embodiments, the server 102 is programmed to receive or transmit transactional data, such as purchase requisitions, purchase orders, or invoices, from or to one of the buyer computers 112*a-112m* representing a requester from an organization and another one of the buyer computers 112*a-112m* representing an approver from the same organization, and similarly from or to one of the supplier computers 122*a-112n* representing an organization and another one of the supplier computers 122*a-122n* representing an organization. The server 102 is programmed to also store such transactional data in association with the appropriate accounts in a storage device, such as the data repository 140. Such transactional data may include metric data of one or more overages calculated or determined by the server 102. The server 102 is programmed to further receive additional data from the data source computers 132*a-q* that can be used to assess the transactional data communicated between one of the supplier computer 122*a-n* and one of the buyer computers 112*a-m*. The additional data may include industry-wide prices of certain items sold by a supplier account or annual revenue or spending data associated with a buyer account. The server 102 is programmed to also store such additional data in a storage device, such as the data repository 140, and to calculate metric data of one or more overages based on the stored or received data.

3.0 Example Automated Invoice Generation Process

Figure 2:
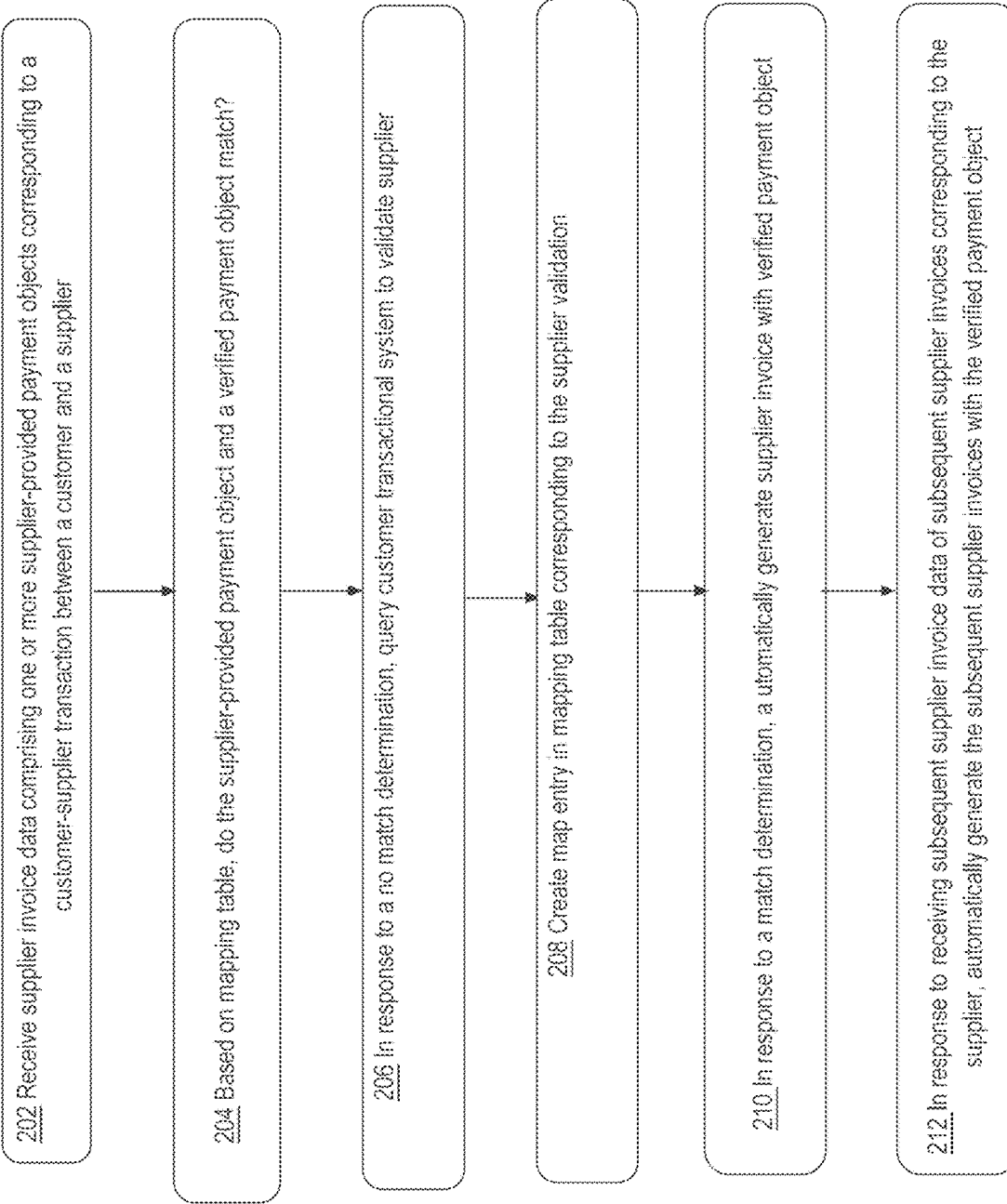
FIG. 2 depicts a flowchart of an example invoice generation process that may be facilitated by an electronic transaction management system.

FIG. 2 depicts a flowchart of an example automated invoice generation process, in accordance with a method of the disclosure. In an embodiment, an automatic invoice generation process is facilitated by an electronic transaction management system. In an example embodiment, invoice generation process 200 may be implemented in part using a spend management cloud service (SMCS) such as server 102 or, more specifically, spend management layer 142. During process 200, a buyer computer 112a-m and a supplier computer 122a-n may perform various respective steps. Performance of a step by one of buyer computers 112a-m or one of supplier computers 122a-n may involve interfacing with the server 102 using a local client application (e.g., a web browser application) and a network (e.g., the internet) that connects the computing devices to the server 102. Such interfacing may include receiving data, media, and information from the server 102 over the network for presentation by the local client application and involve providing input, data, and information from the user to the system via the local client application and the network.

In an example embodiment, a supplier employing one of the supplier computers 122a-n is validated by map entries of a (verified payment object) mapping table. Determination of a match between supplier identification and a map entry serves as a link indicator. In an embodiment, server 102 searches the mapping table for a supplier identification (address) map entry corresponding to the supplier, a link indication between the supplier and corresponding customer. In response to a match determination, server 102 facilitates the automatic generation of subsequent electronic supplier invoices. In an example embodiment, the automatic invoice generation process may include pre-populating supplier invoices with verified payment object data. In an example embodiment, supplier identification may be in the form of an indicator, such as a number, an electronic mail address, or other types of identifiers, representing a distinct supplier. In an embodiment, supplier identification may be in the form of an address indicator for map entry determination of a verified payment object mapping table. For example, supplier identification, in conjunction with a corresponding verified payment identification (or customer payment identification) may point to a distinct storage location, or a mapping table map entry. In an embodiment, supplier identification and verified payment identification (or verified identification) are compared for a match to determine, or not, pre-validation of a corresponding supplier.

At step 202 of FIG. 2, using invoice record interface instructions 154 (FIG. 1), server 102 is configured or programmed to receive supplier invoice data, corresponding to a supplier invoice, from a supplier computer of a supplier to a customer (or buyer) in a supplier-customer transaction. In an embodiment, supplier invoice data includes supplier payment information comprising one or more supplier payment objects representing a supplier payment address. In an embodiment, the supplier invoice is placed on a hold status, pending the outcome of supplier validation.

In an embodiment, the supplier computer is one or more of the supplier computers 122a-n (FIG. 1). Supplier invoice data may include one or more supplier payment information, which comprises, in whole or in part, one or more supplier payment objects. Example supplier invoice data includes, without limitation, terms and conditions of the electronic transaction between a supplier and a buyer, shipping information, supplier payment information, and other invoice-related information. Example supplier payment information includes, without limitation, the name of the supplier as a legal entity and supplier payment object. A supplier payment object may include, without limitation, a supplier identifier or address for payment distribution, such as a supplier "Remit to" (or "Pay to") information. Supplier "Remit to" information may include one or more supplier physical addresses for receiving checks, or supplier bank account details for transacting electronic payments, such as electronic wire and funds transfer.

In an example embodiment, server 102 is configured or programmed to hold a supplier invoice until the supplier validation process is successfully completed. In the event the process is not successfully completed, the supplier invoice is held or discarded but remains unprocessed to safeguard against unauthorized payment distribution, for example, by unauthorized third parties.

At step 204, invoice record processing instructions 156 (FIG. 1), at server 102, are configured or programmed to determine a match between the supplier-provided payment object of step 202 and a (supplier) verified payment object using a mapping table. In an embodiment, server 102 searches map entries of a mapping table for a (supplier) verified payment object (map entry) corresponding to the supplier payment object of step 202. In an embodiment, a first-time supplier to a buyer or a first-time supplier to the system is validated, and once validated, subsequent electronic supplier invoices corresponding to the same supplier enjoy automated creation of electronic invoices by pre-population of the invoice with invoice data.

At step 206, at invoice record processing instructions 156 (FIG. 1), in response to a no-match determination between the supplier-provided payment object and a map entry of the mapping table, server 102 is configured or programmed to query a customer transaction system for supplier validation. An example query may be a request for supplier authorization to the customer financial management system. The request may be in various forms, such as without limitation, a message, signal, flag, bit, or value. In response to the query, server 102 may receive and store a verified payment object from customer buyer computers 112a-m (FIG. 1) for supplier invoice generation automation, which may include populating supplier invoice with invoice data. In an embodiment the verified payment object includes, in part or in whole, the invoice data. In an embodiment, the invoice data is no part of the verified payment object.

In an example method, the supplier is not validated by a corresponding customer in response to the query and the supplier invoice remains unfilled—no payment is distributed to supplier towards the invoice. In an example embodiment, a hold is placed on the supplier invoice until the corresponding customer validates the supplier invoice. In an embodiment, customer validation, in response to the query, has an expiration time where if supplier invoice remains unvalidated within an expected time period, the invoice is permanently unfunded and can be removed from the system. In an embodiment, in the event that the validation time period expires, and the supplier remains unvalidated, a notification or message may be sent by server 102 to the customer transaction system, accordingly. The purpose of the notification or message may be to alert the customer to permanently abandon or to restart, as the customer so chooses, the validation process through a series of handshakes between server 102 and the customer transaction system In response to supplier validation at step 204, at invoice record processing instructions 156 (FIG. 1), at step 208, where a first-time supplier to a buyer or a first-time supplier to the system is validated, server 102 is configured or programmed to create a map entry in the mapping table corresponding to the validated supplier for automating future supplier invoice generation. If the invoice has been placed on hold status at a prior step, the hold may be removed, and the supplier may be paid.

At step 210, at invoice record generation instructions 158 (FIG. 1), in response to a match determination between the supplier payment object (of step 202), a map entry of the mapping table corresponding to the supplier for use in creating a supplier invoice. In some embodiments, a supplier invoice is generated in response to input selecting an invoice function; in other embodiments, for example, if the buyer and supplier have not agreed to use a programmed format of legally compliant invoicing, the invoice may be automatically generated. In an embodiment, the supplier invoice is generated by pre-populating the supplier invoice with the supplier payment object. Map entry is indicative of a pre-verified or pre-authorized supplier, or a linked supplier-customer pair. In an embodiment, a match between at least a part of the supplier-provided payment object and at least a part of the verified payment object links the supplier and corresponding customer. In an embodiment, a supplier and a customer are linked when the supplier is validated. A match determination is an example method for validating the supplier is an indicator of the "Remit to" supplier address matching a verified "Remit to" address. If the invoice has been placed on hold status at a prior step, the hold may be removed, and the supplier may be paid using electronic digital payment processes.

In some embodiments, verified payment objects and/or map entries may be arranged in a mapping table format, a list format, a tagged format, or other suitable data organization. In an embodiment, map entries are stored in an arranged format in a storage device, such as without limitation, data repository 140. In an example embodiment, map entries and/or verified payment objects are arranged in a map table format of a database, structured logic circuits, a part of a programmable gate array device, or other suitable storage spaces. Verified payment object mapping table may be a look-up table, a list, or other forms of data formatting arrangements.

In an embodiment, supplier validation and automatic invoice generation are determined by the server 102 according to a predefined configuration that may be specified by a buyer account via one or more buyer computers 112a-m. For example, a buyer account via one of buyer computers 112a-m may configure server 102 to create, generate or populate a supplier invoice from a specified buyer account identifier.

In an example embodiment, server 102 may store the pre-populated supplier invoice in a table and send the saved supplier invoice to one of the supplier computers 122a-n. The server 102 may send the supplier invoice to one of the supplier computers 122a-n in a variety of different ways and in a variety of different formats. Some of the different ways and formats that the server 102 may send the purchase order to one of the supplier computers 122a-n may include by Email, by cXML, by proprietary eXtensible Markup Language (XML), by a Value-Added Network (EDI VAN), etc.

After step 208 or step 210, at step 212, at invoice record generation instructions (FIG. 1), server 102 is configured or programmed to receive subsequent supplier invoice data associated with subsequent supplier invoices of subsequent supplier-customer transactions between the same supplier and customer pair as that of prior steps of FIG. 2. For each subsequent supplier-customer transaction, server 102 is configured or programmed to create, generate, or populate data for a subsequent supplier invoice. In an embodiment, server 102 is configured or programmed to create, generate, or populate data for a subsequent supplier invoice by populating the supplier invoice with the verified payment object or supplier invoice data. Creating or generating invoices may execute in response to input selecting an invoice function or automatically depending on the configuration.

The server 102 may receive supplier invoices from one or more of supplier computers 122a-n in a variety of different ways and in a variety of different formats. For example, the server 102 may receive the subsequent supplier invoices from one of the supplier computers 122a-n by Email, by cXML, by Advance Ship Notice (ASN), etc.

In an embodiment, a customer request from buyer computers 112a-m to supplier computers 122a-n initiates an invoice generation process. For example, a customer purchase order or information or the indication thereof for a product or service that corresponds to the supplier invoice signals the supplier computers 122a-n to send invoice data for automatic invoice generation.

In an example method, at step 208, at invoice record processing instructions 156, server 102 may be configured or programmed to determine whether an accounts payable hold should be placed on the supplier invoice. The server 102 may make this determination according to a configuration provided by a buyer account via one of the buyer computers 112a-m. For example, the buyer account via one of the buyer computers 112a-m may configure a buyer account with the server 102 to place an account payable hold on all supplier invoices, or a subset of invoices, that satisfy one or more buyer account-specified criteria, so that a buyer account in the account payable department can use the server 102 to review the supplier invoice before the invoice is processed for pre-population by the server 102, at steps 206 or 212. If the supplier invoice is not subject to an accounts payable review at step 208, the supplier invoice may pass for consideration of pre-authorization by the system at step 210. If the invoice is subject to an accounts payable review at step 208 and a hold is placed on the invoice, the invoice may remain in a hold state until the invoice is deleted by a buyer account via one of buyer computers 112a-m or released by a buyer account via one of the buyer computers 112a-m thereby pre-authorizing the supplier to the server 102. Supplier pre-authorization causes the server 102 to receive a payment object from one of the buyer computers 112a-m signaling verification by the server 102.

In an example embodiment, the verification payment object includes a valid supplier address for receiving customer payment, for example, a "Remit to" address. In an embodiment, server 102 is configured or programmed to store copies of the verified payment object in multiple tables. For example, server 102 may store a copy of the verified payment object in a supplier information management (SIM) table and another copy in a master vendor table. In an embodiment, a change to the supplier payment object causes updating the SIM and master vendor tables in addition to updating the mapping table.

The above-described e-procurement process is presented for purposes of illustrating a basic procurement process that may be facilitated by the transaction management system. However, the techniques disclosed herein are not limited to any particular e-procurement process. Instead, the techniques may be used in conjunction with a variety of different e-procurement processes, including those with a different arrangement of steps, other steps, or only some of the steps depicted in FIG. 2.

4.0 Example Networked Computing Environment

Figure 3:
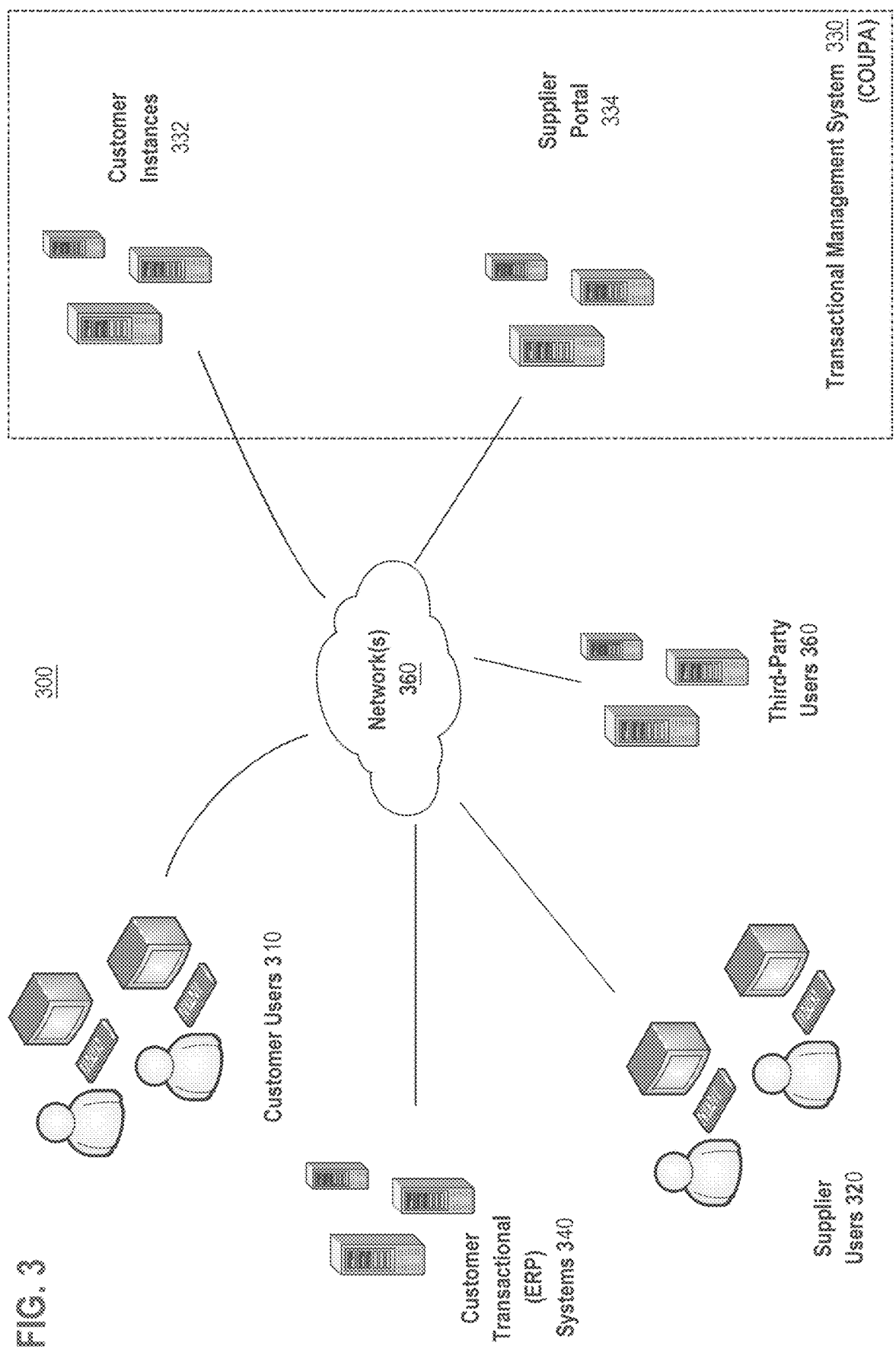
FIG. 3 depicts an example networked computing environment in which techniques for improving supplier invoice generation in a transaction management system based on payment information may be implemented.

FIG. 3 depicts an example networked computing environment 300 in which techniques for improving supplier invoice generation in an electronic spend management system based on payment information may be implemented.

Environment 300 includes buyer users 310 with their respective personal computer systems, enterprise resource planning (ERP) computer systems 340, supplier users 320 and their respective personal computer systems, third-party computer systems 350, network(s) 360, and transaction management system 330 that includes customer instances 332 and transaction management computer system 334. In an embodiment, transaction management system 330 is configured or programmed to function as the transaction management system 152 (FIG. 1).

In an embodiment, computer systems of supplier users 320 are configured or programmed as supplier computers 122a-n (FIG. 1), and computer systems of buyer users 310 are configured or programmed as buyer computers 112a-m (FIG. 1).

Customer instances 332 may store supplier payment information corresponding to buyer-selected supplier users. For example, customer instances 332 may be configured to receive incoming supplier invoice data from supplier users 320 through the network 360. Transaction management system 334 may receive and collect incoming supplier invoices from the customer instances 232. Alternatively, a customer portal of the transaction management system 334 receives and collects supplier invoice data through the network 360. A customer instance may broadly represent a copy of a customer electronic transactional system, such as ERP.

Customer users 210 use their computers to interact with the transaction management system 334 over network(s) 360 according to one or more online interaction protocols. The computers can include desktop computers, laptop computers, tablet computers, mobile phones, or like personal computing devices. The online interaction protocol(s) may be supported by both a client application that executes at the personal computers of the customer users 310 and a server application that executes at one or more server computers that host the transaction management system 330. For example, the client application and the server application may exchange data over network(s) 360 using the HTTP/S networking protocol. The data exchanged may be formatted in a variety of different ways including for example as HTML, CSS, Javascript, XML, JSON, etc. The client application may be an industry-standard web browser application or a mobile application, for example. The transaction management system 230 may cause particular graphical user interfaces (e.g., web pages with particular content) to be displayed by the client applications at the personal computers of the customer users 310 by using the online interaction protocol(s) and network(s) 360 to send information to the computers of the customer users 310 for processing by the client applications. Customer users 310 may interact with the transaction management system 330 by directing user input (e.g., keyboard, pointing device or touch input) to the graphical user interfaces, thereby causing the client applications to use the online interaction protocol(s) to send information over the network(s) 360 to the spend management system 230. Supplier users 320 may likewise use their personal computers to interact with the transaction management system 330 over the network(s) 360 according to the online interaction protocol.

The transaction management system 330 may be hosted in a public cloud. The public cloud may include computing services offered by third-party providers over the public internet (e.g., network(s) 360), making them available to anyone who wants to use or purchase them. The computing services may be sold on-demand, allowing the transaction management system 330 or its provider to pay only per usage for the CPU cycles, storage or bandwidth consumed. Even though the provider of the transaction management system 330 may not also provide the public cloud computing services, the provider of the transaction management system 330 may still be responsible for management and maintenance of the transaction management system 330 within the public cloud, including putting the transaction management system 330 in service on network 360.

Customers may integrate ERP systems 340 and third-party systems 350 with the transaction management system 330 via the network(s) 360. The purpose of the integration may be to import supplier invoices and associated information into the transaction management system 330. Such records and data imported into the transaction management system 330 from ERP systems 340 and third-party systems 350 may be processed by applications of the transaction management system 330, including an application that implements techniques disclosed herein for improving invoice generation for e-procurement.

The integration over network(s) 360 may be accomplished using one or more data integration protocols. One possible integration protocol may use flat files uploaded to and downloaded from a secure file transfer protocol (SFTP) server operated by the provider of the transaction management system 330. The flat files may be CSV files, for example, that contain spend approval cycle time statistics and associated information. Another possible integration protocol for importing supplier information data is using a REST API offered by servers of the transaction management system 330. For example, the flat file integration protocol may be used for bulk import of supplier information, and the REST API integration protocol may be used for real-time import of supplier information including supplier invoice data.

5.0 Example Procedure

In an example embodiment, a supplier-buyer transaction management system may collect supplier payment information, store the collected information, and enter the collected information in a customer ERP transactional system to facilitate payment distribution by the buyer. For example, "Remit to" information for all or a subset of the suppliers to a buyer may be saved in tables in the management system. In an example embodiment, server 102 facilitates payment distribution by a customer ERP system by saving "Remit to" locations on supplier invoices to assist the ERP system in distributing payment against the supplier invoice to the supplier. For example, a supplier invoice may indicate a supplier headquarter address. The location of the supplier headquarter address is collected by the system and provided to the customer ERP system. During payment distribution, customer ERP system can conveniently process payment to the supplier by accessing the "Remit to" location, accordingly, sending or transmitting payment to the supplier "Remit to" address.

In an embodiment, the supplier or buyer need not enter the "Remit to" information for each payment to the supplier if the "Remit to" information is already available in the customer ERP system. In an example embodiment, the supplier "Remit to" information pre-validated and is therefore automatically pre-populated onto the supplier invoice and used to streamline the accounts payment process of e-commerce transactions between supplier-buyer. Additionally, the supplier "Remit to" information is approved by the buyer to further streamline the accounts payable review process because the supplier payment information—"remit to"—is pre-validated.

In accordance with an embodiment, a supplier-buyer relationship may dictate the source of supplier payment information. For example, in an existing supplier-buyer relationship where the supplier is pre-validated, the buyer and the transaction management system may each hold a copy of the supplier payment information. In the absence of an existing supplier-buyer relationship, a transaction management system receives the supplier payment information from the supplier in response to a request from the buyer to the supplier. The supplier is validated through an onboarding process or through the buyer. During a supplier onboarding process, the transaction management system copies the supplier payment information received from one of the supplier computers 122a-n (FIG. 1). In an embodiment, the buyer provides a copy of the supplier payment information. In all cases, the supplier payment information, or at least a relevant portion thereof, is verified prior to linking. For example, supplier-sourced payment information, is verified by the buyer prior to linking. In an embodiment, the supplier payment information, at least in the relevant part, is sourced by the transaction management system. In an embodiment, the supplier payment information is sourced directly by the buyer. Accordingly, a supplier payment object common to a supplier payment information corresponding to a common supplier may be saved in multiple storage locations—supplier computer, transaction management system, and buyer computer system.

In an embodiment, first-time supplier invoice generation requires the transaction management system to establish a link between the supplier and buyer. Subsequent supplier invoice generation use the link to forego payment object verification. A change to the supplier payment object requires a new verification process and a new link.

Figure 4:
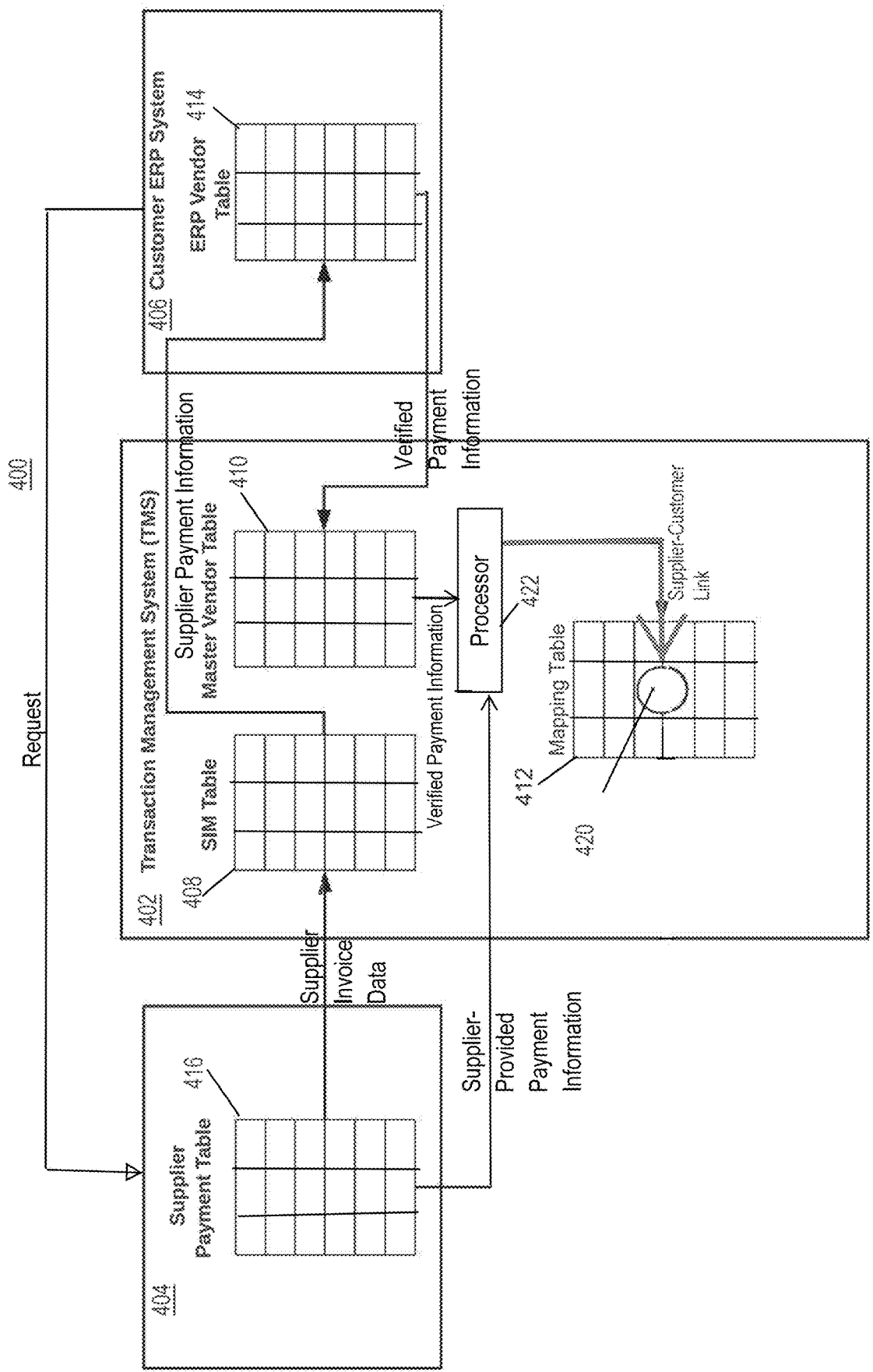
FIG. 4 depicts, in conceptual form, an electronic invoice process flow in accordance with a method of the disclosure.

FIG. 4 depicts an electronic invoice process flow that may be implemented in program instructions in the system that has been described.

Figure 6:
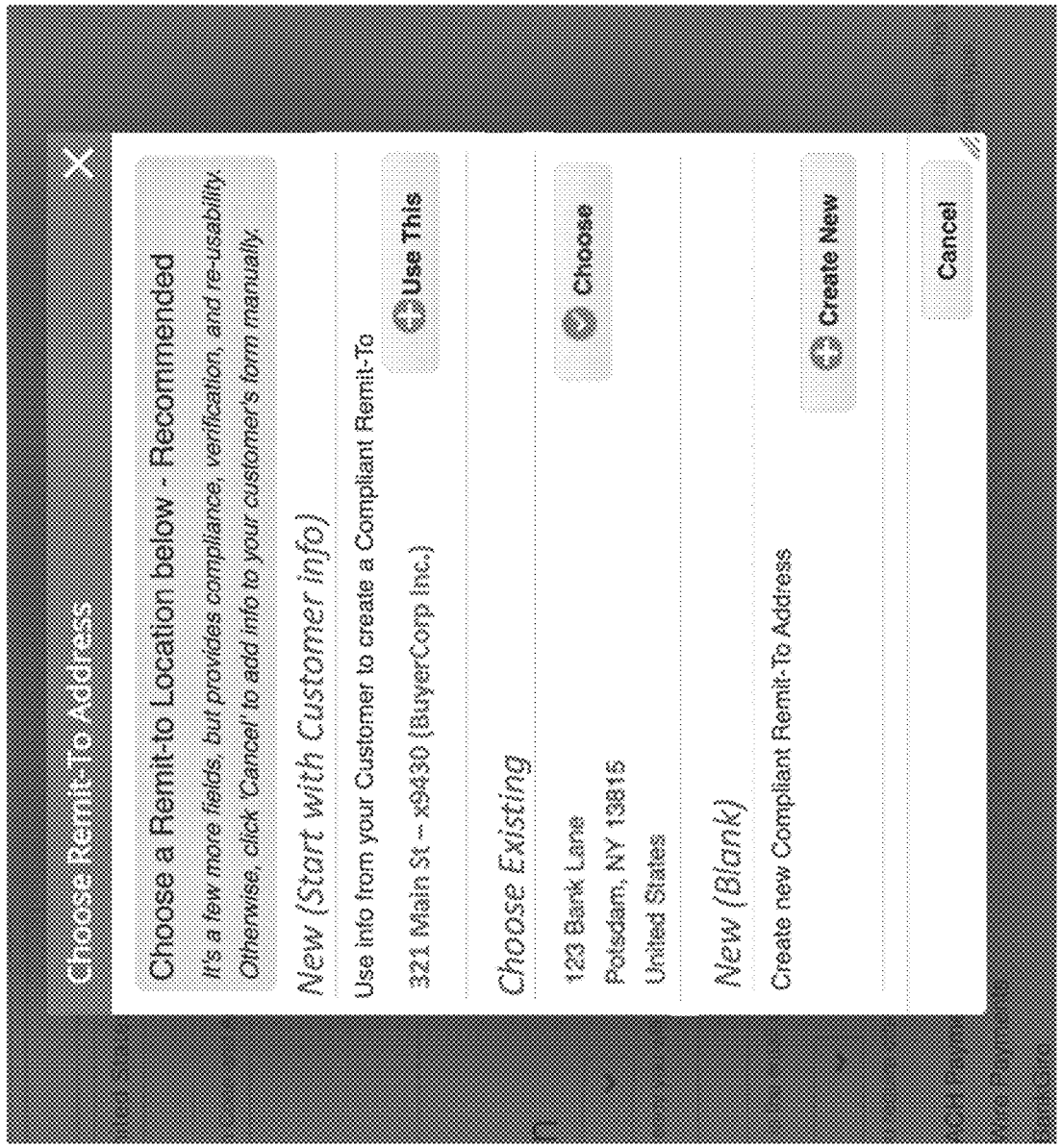
FIG. 6 illustrates an example graphical user interface window that may be displayed as part of a supplier computer interface starting with payment information from a customer computer.

FIG. 6 illustrates an example graphical user interface window that may be displayed as part of a supplier computer interface starting with payment information from a customer computer.

Figure 7:
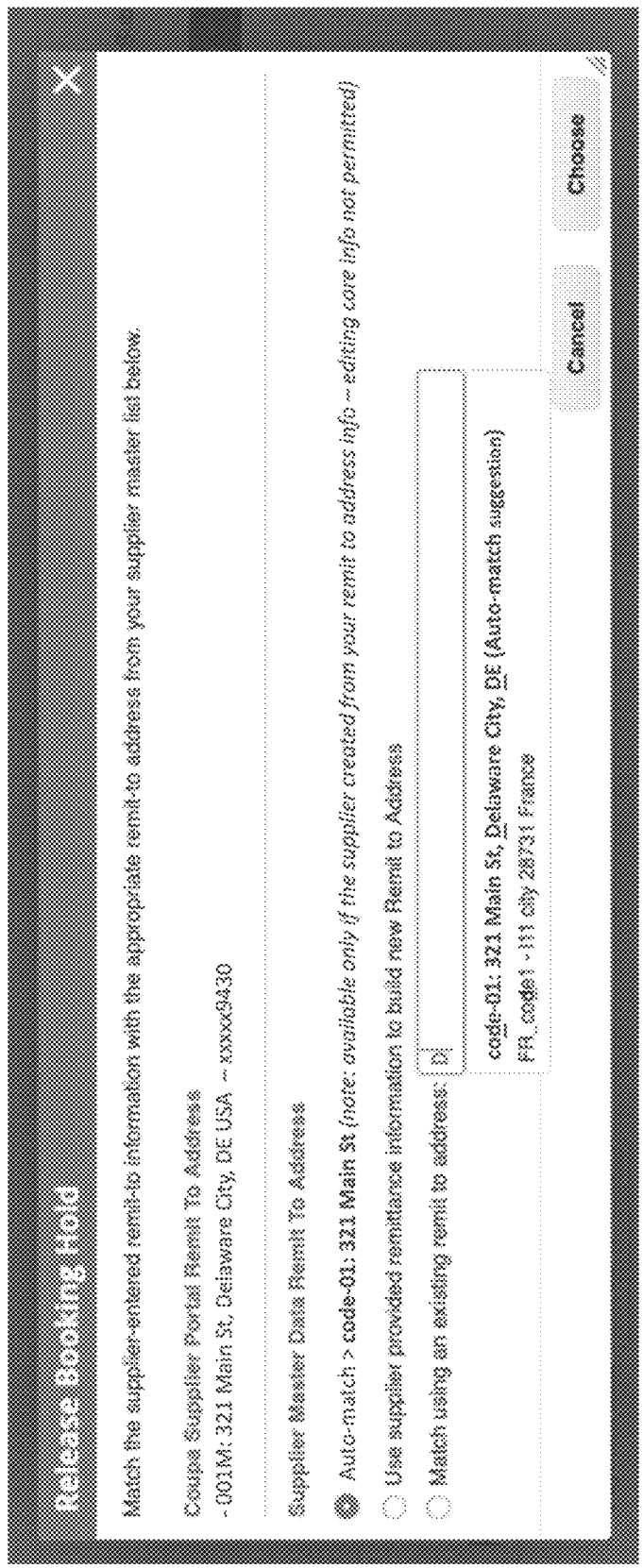
FIG. 7 illustrates an example graphical user interface window that may be displayed as part of a customer or buyer computer interface in which an e-procurement system has automatically suggested matching and synchronizing the data entered by the supplier to their original data.

FIG. 7 illustrates an example graphical user interface window that may be displayed as part of a customer or buyer computer interface in which an e-procurement system has automatically suggested matching and synchronizing the data entered by the supplier to their original data.

Referring first to FIG. 4, an electronic invoice process flow 400 utilizes a supplier portal 404, a transaction management system 402, and a customer ERP (transactional) system that are communicatively coupled. In an embodiment, the transaction management system 402 is configured as transactional processing system 152 (FIG. 1), the supplier portal 404 is configured as supplier portal 360 (FIG. 3), the customer ERP system 406 is customer transaction (ERP) system 340 (FIG. 3). In an embodiment, supplier portal 404 comprises a supplier payment information table 416, transaction management system 402 comprises a supplier information management ("SIM") table 408, a master vendor table 410, and a verified payment object mapping table 412, and buyer transactional system 406 comprises buyer ERP vendor table 414.

In an embodiment, table 408 is configured and programmed to hold supplier-provided payment objects, table 410 is configured and programmed to hold customer-provided payment objects, and mapping table 412 is configured and programmed to hold map entries corresponding to linked supplier-buyers.

In an embodiment, SIM table 408 holds a copy of supplier-provided payment objects from supplier portal 404, and master vendor table 410 holds a copy of verified payment objects, from customer 406.

"SIM" refers to computer-implemented process management for obtaining sufficient authoritative information about a supplier, including a new supplier with respect to the system overall or to a particular buyer, to permit identifying the supplier, communicating with the supplier, conducting buy or supply transactions with the supplier, and ultimately completing payment processes. For example, SIM may facilitate an enforcement process with a requirement to obtain a communication or payment protocol for a supplier, without which transactions cannot be conducted or completed. Policy data or configuration data of a buyer or the service provider may specify what data is mandatory to obtain in SIM and may specify that a supplier is incomplete, unauthorized, or otherwise unable to complete or conduct transactions until specified data is obtained.

In an embodiment, mapping table 412 comprises mapping entries, and a mapping entry is indicative of a supplier-buyer link. For example, map entry 420 represents a link between a particular supplier and a particular buyer. In an embodiment, finding a link indicator in table 412 of a corresponding supplier automates supplier invoice generation. In an example embodiment, map entry 420 may be a link indicator such as, without limitation, a flag, a value, a tag, an address, or other forms of link indications, as previously indicated herein. In an embodiment, the link indicator may be in the form of an identifier, such as an address or pointer to a storage location within or external to the transaction management system 402.

For example, process 422 of the transaction management system 402 (FIG. 4) may be configured or programmed to detect map entry 420 corresponding to a pre-validated supplier. In response to the detection, processor 422 may be configured or programmed to retrieve a verified payment object corresponding to the supplier for automatic invoice generation. Processor 422 may retrieve the verified payment object from map entry 420 of table 412, for example. In an embodiment, processor 422 may retrieve verified payment object from a storage space within or external to the transaction management system 402 identified by a pointer or linked list of map entry 420.

In an embodiment, mapping table 412 exclusively holds map entries for linked buyer-supplier pairs and holds no representation of unlinked supplier-buyer pairs (non-verified suppliers)—no map entry is indicated in table 412. In an embodiment, mapping table 412 is part of storage locations and distinctly identified within the storage locations with an address range or partitions. For example, mapping table 412 may be formed of a set of storage spaces of a storage device, and the set of storage devices is identified by a predetermined address range within mapping table 412. In an embodiment, mapping table 412 may be a part of a storage device or partitioned across a storage device and includes information other than link indicators. For example, without limitation, mapping table 412 may be a part of table 410 or another table or storage space, and mapping table 412 map entries with link indicators are flagged as previously discussed.

In an embodiment where mapping table 422 searches or scans table 422 for a link indication and is unsuccessful, the supplier must be verified, and the corresponding supplier invoice is placed on hold until or if the supplier is successfully verified.

In an embodiment, in the event of a change to the supplier-provided payment object, processor 422 is configured or programmed to remove the corresponding link or map entry (unlink) from mapping table 412 or otherwise change a link indication to an unlink indication. In an embodiment, server 102 may be configured or programmed to remove a corresponding supplier payment object from supplier payment object storage space in table 412 or elsewhere.

In an embodiment, more than one supplier is linked to a customer and a table or storage space, and each supplier link to the customer has a distinct corresponding map entry 420. In such an embodiment and where an identifier or address represents a link, each address uniquely identifies a corresponding supplier and saved in a corresponding distinct storage space.

In an embodiment, supplier portal 404 transmits supplier payment information comprising supplier reference identification to both of the SIM table 408 and mapping table 412. In an embodiment, processor 422 receives a link indicator from supplier portal 404 and saves the received link indicator in SIM table 408. In an embodiment, in response to receiving supplier invoice data and saving the received supplier invoice data in table 408, searches table 412 for a link identifier and fails to find one, processor 422 initiates or causes initiation of supplier verification. Otherwise, in the face of finding a corresponding link identifier in table 422, processor 422 is configured or programmed to generate supplier invoice generation or processing by populating the supplier invoice with the verified payment object. In an example embodiment, processor 422 may be configured or programmed to receive at least a part of supplier invoice directly from supplier portal 404 and not as a part supplier invoice data provided to table 408.

In accordance with disclosed methods, a supplier may be verified in more than one manner. For example, after a failed attempt to find a match in table 412, processor 422, or server 102, may be programmed or configured to seek supplier verification as discussed elsewhere herein. Supplier onboarding may result in supplier verification. In an example, manually entered or electronically received at table 408 by TMS 402 from supplier, supplier-provided payment object is saved by processor 422 in table 408, and customer verified as discussed herein. Yet another manner of verifying a supplier is by customer onboarding one or more suppliers where the customer initiates supplier verification eliminating the possibility of corresponding supplier invoices placed on hold unless the latter is updated. In at least some of the various supplier verification methods, processor 422, or server 102, presents a list of supplier payment objects corresponding to a single supplier, on a graphical user interface, to customer and in response to receiving a verified payment object corresponding to the supplier, the supplier is considered verified. The verified payment object is selected by the customer in response to the displaying of the supplier payment object list. In an embodiment, processor 422 is configured or programmed to place the supplier invoice on hold until completion of supplier verification.

With continued reference to FIG. 4, in an embodiment, invoice generation begins with receipt of a request sent by ERP system 406 by supplier portal 404, causing supplier portal 404 to transmit supplier invoice data from supplier payment table 416 to TMS 402 and as earlier noted, TMS 402 is configured or programmed to save the supplier invoice data at SIM table 408.

In an embodiment, TMS 402 or processor 422 may be configured or programmed to parse supplier invoice data and extract the supplier-provided payment object before saving the supplier-provided payment object. In an embodiment, TMS 402 is configured or programmed to save supplier invoice data in SIM table 408 and transmits only the relevant part of supplier invoice data, such as a supplier-provided payment object. In an embodiment, TMS 402 is configured or programmed to save and transmit supplier invoice data to customer ERP system 406 from which the supplier payment object is extracted by customer ERP system 406.

A change or update to the supplier-provided payment object, for example, by supplier portal 404, triggers TMS 402, for example, processor 422, to update the SIM table 408 accordingly. In an embodiment, TMS 402 is configured or programmed to replace a supplier-provided payment object in SIM table 408 with an updated supplier-provided payment object from user portal 404 in response to a change to a corresponding supplier payment object at supplier portal 404, for example. In an embodiment, TMS 402 is configured or programmed to save the updated payment object in a new SIM table 408 entry or to replace the old supplier payment object with the updated payment object. The supplier payment object update triggers supplier re-validation—an existing link is broken, as described elsewhere herein relative to the validation process.

As part of supplier validation, TMS 402 is configured or programmed to transmit the supplier payment object from SIM table 408 to customer ERP system 406 for validation and entry. Customer ERP system 404 validates supplier payment object and saves or enters the supplier payment object in ERP vendor table 414 as verified payment information corresponding to the supplier. In an embodiment, TMS 402 is configured or programmed to collect supplier payment object location from the supplier invoice data and enter the collected supplier payment objection location in ERP system 406 for customer payment distribution. For example, the collected supplier payment object location may be saved in one of the tables of TMS 402 or another storage space of table 402 and, when transmitted to the EPR system, caused to be saved in table 414 or elsewhere.

In an embodiment in response to supplier validation by the corresponding customer, the customer ERP system 406 transmits verified payment information, and in response to receiving the verified payment information from ERP system 406, processor 422 may be configured or programmed to save the received verified payment information to master vendor table 410. In an embodiment, processor 422 receives and saves a verified payment object into master vendor table 410. In an embodiment, processor 422 parses the received verified payment information to retrieve the verified payment object before saving the verified payment object into table 410. In an embodiment, processor 422 is configured or programmed to save the received verified payment information into table 410, and when the time comes to search table 412, parses the received verified payment information and retrieves the verified payment object before searching table 412.

In an embodiment, each of supplier-provided payment object and verified payment object is "Remit to" or "payable to" physical or electronic supplier addresses to which payment is to be distributed. Accordingly, processor 422 compares the two "Remit to" addresses to try to verify the supplier.

In an embodiment, processor 422 is configured or programmed to search mapping table 412 for an indication of a pre-existing supplier-customer relationship between the (validated) supplier and customer in a corresponding customer-supplier transaction. In an example embodiment, processor 422 is configured or programmed to determine a match between the supplier-provided payment object, originating from supplier portal 404 and saved in SIM table 408, to a supplier-corresponding verified payment object from master vendor table 410 by detecting, or not, a corresponding link indicator, for example without limitation, a map entry, in the mapping table 412 to try to find a link between the supplier and customer.

In the event processor 422 determines no match, a map entry, such as map entry 420, in table 412, processor 422 initiates supplier validation and if successful, creates a map entry in table 412. Processor 422 notifies or queries ERP system 406 for supplier validation. In an embodiment, no match determination may cause customer ERP system 406 to impose a booking hold on the supplier invoice until the buyer releases the booking hold and validates the supplier, as earlier discussed.

In an embodiment, EPR system 406 releases the booking hold in response to successfully completing a supplier validation process, as earlier described. In an example embodiment, the customer may wish to avoid sending payment to an old or incorrect supplier address for legal liability or customer relation issues. To guard against such an unauthorized payment distribution, in an embodiment, the supplier must be validated or is pre-validated prior to automatic invoice generation. In an embodiment, TMS 102 is configured or programmed to facilitate the selection of the current supplier payment objects. TMS 102 is configured or programmed to present a selection of supplier payment objects at a GUI display of a buyer computer 112*a-m* (FIG. 1). For example, supplier's New York, Pennsylvania, and Delaware addresses, previously uploaded to TMS 102, may be presented to a customer user for selection and supplier validation. In an embodiment, supplier portal 404 uploads the list to TMS 102, and TMS 402 is configured or programmed to save the list in local or remote storage space and to present the list for customer selection. Selection of a supplier payment objects from the list signifies supplier validation.

In an embodiment, supplier payment object selection may include presenting a pop-up window with a drop-down list of known supplier addresses onto a buyer computer GUI. In response to a buyer selection, the supplier is considered verified, and TMS 102 creates a supplier-customer mapping or link, as previously discussed.

In an embodiment, when appropriate, TMS 402 is configured or programmed to designate a previously verified supplier payment object, as a default supplier "Remit to" address, to expedite invoice processing and generation.

In an embodiment, server 102 may be configured or programmed to facilitate imposing rules to improve e-commerce transactions. The rules may be conditions. In an embodiment, the rules may be generated through a self-learning or self-modifying process or algorithm. For example, a machine learning algorithm may be trained over time to learn behavior or attributes unique to a supplier and TMS 402 is configured or programmed to check for updated supplier payment object based on learned supplier attributes.

In an embodiment, a rule-based engine may be part of the TMS 402 or externally located to TMS 402 and a part of the server 102. A rule-based engine can be configured or programmed to request updated payment information from a corresponding supplier. In an embodiment, server 102 is configured to create or use a pre-existing set of conditions associated with a corresponding supplier. Upon meeting the requisite conditions, server 102 may request updated payment information of supplier. Rules can be location, commodity, or industry, and server 102 may be configured or programmed to set up a startup supplier with rules requiring frequent requests for updates relative to a mature supplier. Startup companies are more likely to relocate as they undergo rapid growth whereas mature companies tend to remain steady with rather permanent payment locations. In another example, supplier of a common commodity, such as office supplies, may be more prone to change its payment information than the supplier of a less common commodity. The request may be made of a supplier, buyer, or both. In an embodiment, a dispute between the parties may affect a customer's supplier payment preferences. For example, server 102 may request supplier payment information from a corresponding buyer, the request may include confirmation of current supplier payment information and inquire into potential dispute or rejection of a supplier invoice. Based on the buyer's response, server 102 may be configured or programmed to send an inquiry to the supplier requesting updated payment information to avoid rejected invoices in the future. In a self-learning embodiment, server 102 is configured or programmed to train a machine learning algorithm based on each supplier tendencies and attributes, i.e. commodity type, location, payment habits, or tendencies, and adjust corresponding supplier rules and conditions accordingly to improve efficiency and payment reliability.

In an embodiment, various supplier validation processes may cause a map entry indication in a verified payment object mapping table, such as table 412. In some embodiments, a change to the supplier payment information may cause server 102 to update tables 408-412 accordingly. For example, a change to one of the supplier payment objects of table 416 of supplier portal 404 causes server 102 to update tables 408-412. The tables of FIG. 4 may use various storage types in different embodiments, such as flat files or a relational database.

In an embodiment, TMS 402 is configured or programmed to collect and enter the supplier address location into ERP system 406 to facilitate ease of payment distribution. In an embodiment, TMS 402 saves collected supplier address, such as "Remit to", locations from the supplier invoice in ERP system 406. When performing payment distribution, ERP system 406 accesses the supplier address and sends payment toward the invoice to a destination defined by the supplier address.

FIG. 2 and FIG. 4 depict a flowchart of an example process and an example process for, respectively, for improved invoice generation in an electronic transaction management system. FIG. 2 and FIG. 4 are shown in simplified, schematic format for purposes of illustrating a clear example and other embodiments may include more, fewer, or different elements connected in various manners. FIG. 2 and FIG. 4 are intended to disclose an algorithm, plan, process flow, or outline that can be used to implement one or more computer programs or other software elements which when executed cause performing the functional improvements and technical advances that are described herein. Furthermore, the flow diagrams, process flows, and block diagrams herein are described at the same level of detail that persons of ordinary skill in the art ordinarily use to communicate with one another about algorithms, plans, process flows, or specifications forming a basis of software programs that they plan to code or implement using their accumulated skill and knowledge.

Using the above discussed techniques, the efficiency of the invoice generation process as discussed with respect to FIG. 4 is improved. Pre-validation of a supplier increases transaction efficiency by avoiding manual supplier payment entry for each supplier-buyer e-commerce transaction. Techniques discussed herein enhance transaction security by facilitating supplier validation for each transaction between supplier and buyer. An unauthorized third party is prevented from interfering with the transaction to re-direct supplier invoice payment distribution to an unauthorized payment destination. Payment distribution is made convenient based on collection of supplier payment location as discussed herein. As a result, compute resources and memory are conserved by reducing the number of supplier validations due to invoice generation automation. Thus, the techniques herein result in an e-commerce transactional process that uses fewer CPU cycles and less memory to complete an invoice generation process.

6.0 Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques or may include digital electronic devices such as at least one application-specific integrated circuit (ASIC) or field-programmable gate array (FPGA) that is persistently programmed to perform the techniques, or may include at least one general-purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body-mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 5:
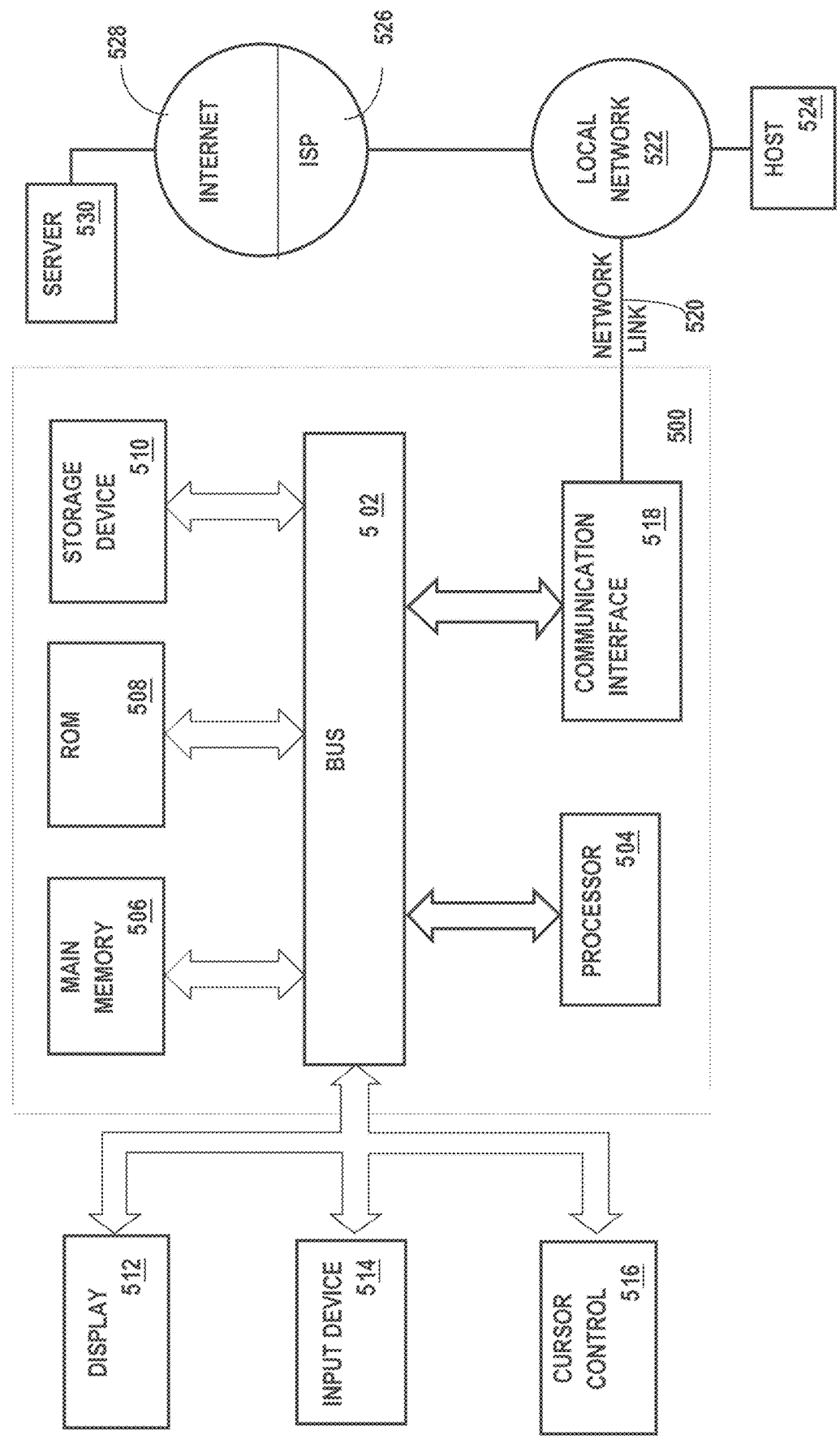
FIG. 5 is a block diagram that illustrates a computer system upon which an embodiment of the invention may be implemented.

FIG. 5 is a block diagram that illustrates an example computer system with which an embodiment may be implemented. In the example of FIG. 5, a computer system 500 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 500 includes an input/output (I/O) subsystem 502 which may include a bus and/or other communication mechanism(s) for communicating information and/or instructions between the components of the computer system 500 over electronic signal paths. The I/O subsystem 502 may include an I/O controller, a memory controller and at least one I/O port. The electronic signal paths are represented schematically in the drawings, for example as lines, unidirectional arrows, or bidirectional arrows.

At least one hardware processor 504 is coupled to I/O subsystem 502 for processing information and instructions. Hardware processor 504 may include, for example, a general-purpose microprocessor or microcontroller and/or a special-purpose microprocessor such as an embedded system or a graphics processing unit (GPU) or a digital signal processor or ARM processor. Processor 504 may comprise an integrated arithmetic logic unit (ALU) or may be coupled to a separate ALU.

Computer system 500 includes one or more units of memory 506, such as the main memory, which is coupled to I/O subsystem 502 for electronically digitally storing data and instructions to be executed by processor 504. Memory 506 may include volatile memory such as various forms of random-access memory (RAM) or another dynamic storage device. Memory 506 also may be used for storing temporary variables or other intermediate information during execution of instructions to be executed by processor 504. Such instructions, when stored in non-transitory computer-readable storage media accessible to processor 504, can render computer system 500 into a special-purpose machine that is customized to perform the operations specified in the instructions.

Computer system 500 further includes non-volatile memory such as read-only memory (ROM) 508 or other static storage device coupled to I/O subsystem 502 for storing information and instructions for processor 504. The ROM 508 may include various forms of programmable ROM (PROM) such as erasable PROM (EPROM) or electrically erasable PROM (EEPROM). A unit of persistent storage 510 may include various forms of non-volatile RAM (NVRAM), such as FLASH memory, or solid-state storage, magnetic disk, or optical disks such as CD-ROM or DVD-ROM, and may be coupled to I/O subsystem 502 for storing information and instructions. Storage 510 is an example of a non-transitory computer-readable medium that may be used to store instructions and data which, when executed by the processor 504, cause performing computer-implemented methods to execute the techniques herein.

The instructions in memory 506, ROM 508 or storage 510 may comprise one or more sets of instructions that are organized as modules, methods, objects, functions, routines, or calls. The instructions may be organized as one or more computer programs, operating system services, or application programs, including mobile applications. The instructions may comprise an operating system and/or system software; one or more libraries to support multimedia, programming or other functions; data protocol instructions or stacks to implement TCP/IP, HTTP or other communication protocols; file processing instructions to interpret and render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 500 may be coupled via I/O subsystem 502 to at least one output device 512. In one embodiment, output device 512 is a digital computer display. Examples of a display that may be used in various embodiments include a touch screen display or a light-emitting diode (LED) display or a liquid crystal display (LCD) or an e-paper display. Computer system 500 may include other type(s) of output devices 512, alternatively or in addition to a display device. Examples of other output devices 512 include printers, ticket printers, plotters, projectors, sound cards or video cards, speakers, buzzers or piezoelectric devices or other audible devices, lamps or LED or LCD indicators, haptic devices, actuators or servos.

At least one input device 514 is coupled to I/O subsystem 502 for communicating signals, data, command selections or gestures to processor 504. Examples of input devices 514 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 516, which may perform cursor control or other automated control functions such as navigation in a graphical interface on a display screen, alternatively or in addition to input functions. Control device 516 may be a touchpad, a mouse, a trackball, or cursor direction keys for communicating direction information and command selections to processor 504 and for controlling cursor movement on display 512. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 514 may include a combination of multiple different input devices, such as a video camera and a depth sensor.

In another embodiment, computer system 500 may comprise an internet of things (IoT) device in which one or more of the output devices 512, input device 514, and control device 516 are omitted. Or, in such an embodiment, the input device 514 may comprise one or more cameras, motion detectors, thermometers, microphones, seismic detectors, other sensors or detectors, measurement devices or encoders and the output device 512 may comprise a special-purpose display such as a single-line LED or LCD display, one or more indicators, a display panel, a meter, a valve, a solenoid, an actuator or a servo.

When computer system 500 is a mobile computing device, input device 514 may comprise a global positioning system (GPS) receiver coupled to a GPS module that is capable of triangulating to a plurality of GPS satellites, determining and generating geo-location or position data such as latitude-longitude values for a geophysical location of the computer system 500. Output device 512 may include hardware, software, firmware and interfaces for generating position reporting packets, notifications, pulse or heartbeat signals, or other recurring data transmissions that specify a position of the computer system 500, alone or in combination with other application-specific data, directed toward host 524 or server 530.

Computer system 500 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 500 in response to processor 504 executing at least one sequence of at least one instruction contained in main memory 506. Such instructions may be read into main memory 506 from another storage medium, such as storage 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 510. Volatile media includes dynamic memory, such as memory 506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 502. Transmission media can also take the form of acoustic or light waves, such as those generated during radio-wave and infra-red data communications.

Various forms of media may be involved in carrying at least one sequence of at least one instruction to processor 504 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 500 can receive the data on the communication link and convert the data to be read by computer system 500. For instance, a receiver such as a radio frequency antenna or an infrared detector can receive the data carried in a wireless or optical signal and appropriate circuitry can provide the data to I/O subsystem 502 such as place the data on a bus. I/O subsystem 502 carries the data to memory 506, from which processor 504 retrieves and executes the instructions. The instructions received by memory 506 may optionally be stored on storage 510 either before or after execution by processor 504.

Computer system 500 also includes a communication interface 518 coupled to bus 502. Communication interface 518 provides a two-way data communication coupling to network link(s) 520 that are directly or indirectly connected to at least one communication networks, such as a network 522 or a public or private cloud on the Internet. For example, communication interface 518 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 522 broadly represents a local area network (LAN), wide-area network (WAN), campus network, internetwork or any combination thereof. Communication interface 518 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 518 sends and receives electrical, electromagnetic or optical signals over signal paths that carry digital data streams representing various types of information.

Network link 520 typically provides electrical, electromagnetic, or optical data communication directly or through at least one network to other data devices, using, for example, satellite, cellular, Wi-Fi, or BLUETOOTH technology. For example, network link 520 may provide a connection through a network 522 to a host computer 524.

Furthermore, network link 520 may provide a connection through network 522 or to other computing devices via internetworking devices and/or computers that are operated by an Internet Service Provider (ISP) 526. ISP 526 provides data communication services through a world-wide packet data communication network represented as internet 528. A server computer 530 may be coupled to internet 528. Server 530 broadly represents any computer, data center, virtual machine or virtual computing instance with or without a hypervisor, or computer executing a containerized program system such as DOCKER or KUBERNETES. Server 530 may represent an electronic digital service that is implemented using more than one computer or instance and that is accessed and used by transmitting web services requests, uniform resource locator (URL) strings with parameters in HTTP payloads, API calls, app services calls, or other service calls. Computer system 500 and server 530 may form elements of a distributed computing system that includes other computers, a processing cluster, server farm or other organization of computers that cooperate to perform tasks or execute applications or services. Server 530 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to interpret or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 530 may comprise a web application server that hosts a presentation layer, application layer and data storage layer such as a relational database system using structured query language (SQL) or no SQL, an object store, a graph database, a flat file system or other data storage.

Computer system 500 can send messages and receive data and instructions, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage 510, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 504. While each processor 504 or core of the processor executes a single task at a time, computer system 500 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

7.0 Extensions and Alternatives

In the foregoing specification, embodiments of the disclosure have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A computer-implemented method executed using a transaction management system that is communicatively coupled to a customer transaction system and a supplier computer via a data communication network, the supplier computer storing a supplier payment table, the customer transaction system storing a vendor table, the transaction management system storing a supplier information management (SIM) table, a master vendor table, and a verified payment object mapping table, the method comprising:

creating and storing, in the master vendor table, a plurality of verified payment objects that correspond to a plurality of different suppliers that are identified in the vendor table, and creating and storing in the verified payment object mapping table, based on the master vendor table, a plurality of map entries comprising links of particular customers to particular suppliers;

using invoice record interface instructions, receiving into the SIM table supplier invoice data of a supplier invoice corresponding to a supplier of a customer of a supplier-customer transaction, the supplier invoice data including comprising one or more supplier payment objects, each supplier payment object comprising a digital programmatic object maintained in computer memory and comprising a supplier payment address corresponding to the supplier;

using invoice record processing instructions, and based on a link existing in the verified payment object mapping table, determining whether the supplier payment object from the SIM table matches a verified payment object in the master vendor table;

using the invoice record processing instructions, in response to determining that the supplier payment object does not match the verified payment object, querying the customer transaction system to validate the supplier, receiving verified payment information from the customer transaction system, and automatically creating a map entry with a new supplier-customer link corresponding to the supplier in the verified payment object mapping table;

using invoice record generating instructions, in response to determining that the supplier payment object matches the verified payment object, updating one or more of a "remit to" address or other data in an electronic supplier invoice using data from the verified payment object;

using the invoice record generation instructions, in response to receiving subsequent supplier invoice data associated with subsequent supplier invoices of subsequent supplier-customer transactions corresponding to the supplier, using the new supplier-customer link to forego payment object verification and updating one or more of a "remit to" address or other data of the subsequent supplier invoices using data from the verified payment object.

2. The method of claim 1, the automatically generating the supplier invoice and subsequent supplier invoices further comprising populating the supplier invoice and the subsequent supplier invoices corresponding to the supplier with the verified payment object.

3. The method of claim 2, further comprising in response to a change to the supplier payment object, re-validating the supplier by querying the customer transaction system to validate the supplier, receiving verified payment information from the customer transaction system, and automatically creating a map entry with a further new supplier-customer link corresponding to the supplier in the verified payment object mapping table.

4. The method of claim 2, further comprising in response to a change to the supplier payment object, updating the verified payment object mapping table based on the change including removing the map entry corresponding to the supplier of the supplier payment object.

5. The method of claim 1, further comprising for at least one subsequent supplier-customer transaction, in response to the no-match determination, querying a customer transaction system to validate the supplier.

6. The method of claim 5, further comprising in response to the querying a customer transaction system, receiving the verified payment object from the customer transaction system and creating the map entry in the verified payment object mapping table based on the verified payment object from the customer transaction system, wherein the map entry is indicative of supplier validation.

7. The method of claim 6, further comprising:
storing the supplier payment object in a first table;
in response to the querying of the customer transaction system, receiving and storing the verified payment object in a second table;
the creating the map entry in the verified payment object mapping table in response to receiving the verified payment object from the second table;
in response to a change to the supplier payment object, updating the first table, the second table, and the verified payment object mapping table according to the changed supplier payment object.

8. The method of claim 6, wherein the map entry is a flag, bit, tag, code, pointer, linked list, or a combination thereof.

9. The method of claim 1, further comprising:
performing an onboarding process to validate the supplier including causing displaying a selection of supplier payment objects on a graphical user interface (GUI) of a customer computer to validate the supplier;
in response to receiving a selection of the displayed supplier payment objects, creating a map entry in the verified payment object mapping table, the map entry indicating validation of the supplier.

10. The method of claim 1, further comprising the map entry representing a verification indication of the supplier.

11. The method of claim 1, wherein the customer transaction system is an enterprise resource planning (ERP) system.

12. The method of claim 1, further comprising:
in response to determining that the supplier payment object does not match the verified payment object, placing an invoice corresponding to the supplier payment object on a booking hold;
releasing the booking hold when the supplier is successfully verified via the querying and the automatically creating the map entry.

* * * * *